Figure 1:
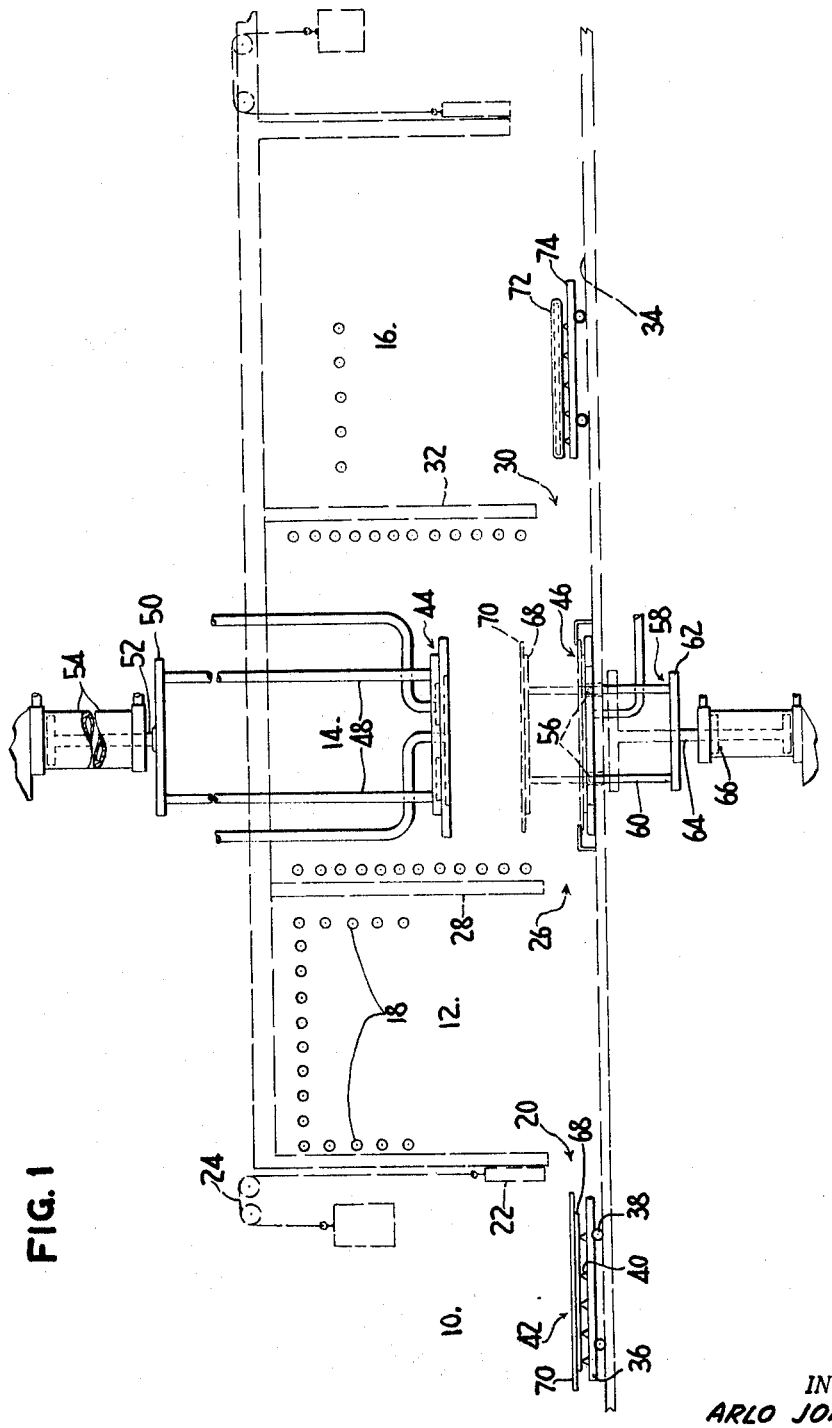

INVENTOR.
ARLO JORGENSEN
BY
Oscar L. Spencer
ATTORNEY

United States Patent Office 3,272,611
Patented Sept. 13, 1966

3,272,611
APPARATUS FOR MAKING MULTIPLE
GLAZED UNITS
Arlo Jorgensen, Pittsburgh, Pa., assignor to Pittsburgh Plate Glass Company, Pittsburgh, Pa., a corporation of Pennsylvania
Filed Feb. 28, 1962, Ser. No. 176,249
4 Claims. (Cl. 65—152)

The present invention relates to double glazed units comprising spaced sheets of glass hermetically sealed together about their edges and has particular relation to apparatus for supporting the glass sheets during the sealing operation.

A method for making welded-edge double glazed units is disclosed in U.S. Patent 2,624,979, issued to William R. Clever and Harry O. Phalin. The process comprises supporting two sheets of glass in superposed but slightly spaced relationship to each other, one of said sheets having a pore hole therein, heating the margins of the upper sheet until they bend and become welded with the margins of the lower sheet, pulling the upper sheet upwardly to provide a chamber between the sheets and abruptly increasing the air pressure within the unit to effect filleting of the welded connection between the sheets.

In this process the heating of the edges of the glass is effected by localized electrical heating. In order to initiate the electrical heating operation, it is desirable to apply a stripe of an electrically conductive material such as colloidal graphite on the top surface of the upper sheet of glass near the edges of the sheet. An electric current is then passed through the stripe from a high voltage source to effect heating of the stripe and the glass underneath the stripe. After the heating operation has raised the temperature of the glass a sufficient amount, the glass itself becomes a conductor so that the electrical heating is continued even after the electrically conductive strip has been burned away. As the edges of the top sheet soften and bend down onto the lower sheet, the edges of the lower sheet are heated by the electrically heated edges of the upper sheet and soon the edges of the lower sheet also become electrically conductive, soften, and fuse to the upper edges, completing the welding operation.

In a process for making all-glass, welded, double glazed units such as described above, the glass sheets are first washed and then the top surface of the upper sheet is striped with a collodial graphite to form the electrically conductive stripe, and the bottom surface of the lower sheet in striped with a micaceous material, to prevent the bottom sheet of glass from sticking to the platen in the welding furnace. This striping procedure may be carried out in the method taught by U.S. Patent 2,999,036.

After the glass sheets are striped they are then placed one on top of the other upon a cariage with the upper sheet slightly larger than the lower sheet and passed into a preheating furnace wherein the glass is heated to a temperature between 750° and 1000° F. It is necessary to preheat the glass sheets prior to the welding operation to prevent cracking of the glass during the initial stages of the welding. After the glass has been preheated, it is moved into a welding chamber where the heated glass is removed from the carriage and placed in proper position for welding. This transferring may be accomplished in the method taught by U.S. Patent 2,900,761 which teaches the transferring of the pair of glass sheets without contacting the surfaces thereof which are to be the inside surfaces of the welded unit.

After the glass has been welded and the welded connection between the sheets "puffed" to effect filleting of this connection, the assembly is passed into an annealing chamber and thereafter can be finally conditioned in any of several standard operations.

The popularity of the welded edge, all-glass double glazed units has created a demand to use such units to satisfy a great many of the consumer requirements. All-glass welded units are fabricated in a greatly varied range of sizes, varying from small closures of 12 by 16 inches to a picture window size of 48 by 68 inches, and all glass welded units are also manufactured in sizes of 30 by 72 inches for sliding glass doors. These figures are merely illustrative of the range in which various sizes of welded units are fabricated. Experience has shown that a simple flat vacuum platen, of the type shown in the Patent 2,624,979, cannot satisfactorily be employed to produce a wide range of unit sizes. If the upper glass sheet extends beyond the dimensions of the upper platen by more than 3 or 4 inches, the overhanging portion tends to gradually sag and droop rather than bend sharply down toward the lower sheet of glass upon softening. In so doing, a bow develops in the glass of the unit, the air space between the glass sheets is not uniform, and the welded seam is much larger than tolerable. Thus, a plurality of platen sizes must be used to accommodate the varying sizes of welded glass units to be fabricated.

Various attempts have been made to devise a supporting assembly with an interchangeable platen. The structures developed generally comprised a support platen with an interchangeable platen assembly bolted thereto. However, each of the structures developed has been deficient for one of several reasons; first, there was an arcing problem in that the high voltages involved in the welding operation, i.e., on the order of 23,000 volts, would pump from the electrodes to any nut and bolt assembly that was used to connect an interchangeable platen to a standard support. In so doing, the surface of the glass sheet nearest the arc would burn and/or melt resulting in a wasted unit. Secondly, in standard production an interchangeable platen is desirably changed two or three times a day due to the variety of commercial orders that must be satisfied. However, it was necessary to permit the interchangeable platens to sufficiently cool before they could be unbolted, handled and removed from their supporting platen. This would take upwards of 2 or 3 hours, reducing production time by that amount. Thirdly, due to the large sizes involved, it was quite difficult to handle the weighty interchangeable platens and even harder to accurately align the interchangeable platen with the support platen in order to bolt them together.

Figure 2:
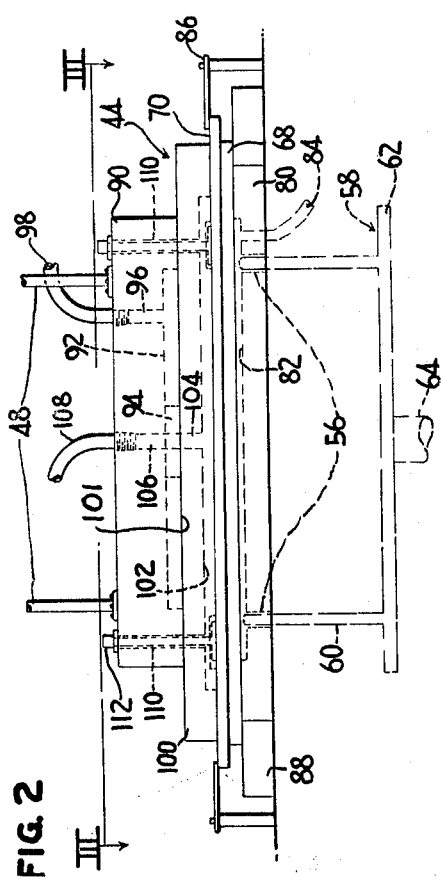

According to the present invention, the above mentioned difficulties are overcome by providing essentially a supporting vacuum chuck or platen which holds an interchangeable vacuum chuck or platen that engages and supports the upper glass sheet during the welding operation. Both platens operate on individual vacuum supplies. The invention will be better understood with reference to the specification which follows in addition to the drawings which accompany the specification wherein:

FIGURE 1 is a diagrammatic arrangement of apparatus for welding sheets of glass; and FIGURE 2 is an elevation view of the upper and lower platen assemblies.

An appropriate embodiment of apparatus for use in forming an all glass, welded-edge double glazed unit is shown in FIGURE 1. A series of stations or chambers are provided, 10 for loading, 12 for preheating, 14 for welding, and 16 for annealing. The chambers 12, 14, and 16 are constructed of an appropriate refractory material such as firebrick.

Chamber 12 constitutes a preheating chamber which is heated by any convenient means, such as electrical heaters 18 disposed about the walls of the chamber. Of course, gas burners could be substituted for the electrical heating elements if so desired. Chamber 12 is provided with an outer door or inlet 20 having a closure 22 which may be raised or lowered by means of conventional closure operating mechanism 24. Chamber 12 is designed to preheat the glass to a temperature between 750° and 1000° F. in order to prevent breakage of the glass due to thermal stresses during subsequent welding operations.

Chamber 12 communicates with welding chamber 14 through a door or opening 26 formed below the partition 28 between the two chambers. A similar opening 30 provides communication below the wall 32 between the welding chamber 14 and the annealing chamber 16.

For purposes of carrying sheets of glass through the chambers of successive operations, a trackway 34 is provided. This trackway extends through the various doors or openings to the chambers, and preferably extends sufficiently far outside the chamber 12 to provide a loading zone 10. Upon the trackway 34 is disposed a first transfer car 36. The car is preferably constructed of stainless steel and travels upon wheels 38 riding on track 34. The upper surface of the car is provided with a series of graphite studs or buttons 40 designed to hold a pair 42 of glass sheets in spaced relation with respect to the framework. The carriage may be reciprocated upon the trackway by any convenient apparatus, e.g. a rack and pinion arrangement or a chain and pulley arrangement (not shown).

Sheets of glass are appropriately preheated upon the car 36 in chamber 12 and are then run into the welding chamber 14 for the subsequent union and shaping to form the double glazed units.

The apparatus within the welding chamber includes an upper vacuum platen assembly 44 and a lower vacuum platen assembly 46. The upper platen assembly 44 is connected to the lower extremities of supports 48 which pass through the roof of chamber 14 and are permanently attached, as by bolting, the plate 50. Plate 50 is connected to the lower extremity of piston rod 52 which moves vertically in a cylinder 54 mounted over the roof of chamber 14. The platen assemblies 44 and 46 will be described in detail hereinafter.

Extending through holes 56 in the platen of the lower assembly 46 from beneath the chamber 14 are glass supporting means 58. These supporting means are in the form of vertical rods 60 having their uppermost tips capped with some material such as asbestos which will not mark or break the glass or deteriorate at the temperature of operation of the welding furnace. The lower ends of the rods 60 are fastened to a plate 62 which is mounted on the end of a piston rod 64 in cylinder 60. The supporting means is reciprocated through the bottom of the welding furnace by means of a fluid in the cylinder or by other suitable means. The rods 60 may be hollow and connected to a source of vacuum to hold the glass in position thereon if necessary or desired.

In one mode of operation, bottom glass sheet 68 and top glass sheet 70 are carried into welding chamber 14 in sandwich form after they have been preheated in chamber 12 upon carriage 36. The carriage 36 is moved into the chamber 14 and stopped so that the pair 42 of glass sheets 68 and 70 is directly above glass supporting means 58. The piston rod 64 is actuated upwardly in cylinder 66 so as to cause supporting means 58 to rise through holes 56 in the platen of the lower assembly 46 and through slot openings in carriage 36 to engage the bottom surface of the bottom glass sheet 68 and raise the pair 42 of glass sheets a few inches off the graphite supporting knobs 40.

The carriage 36 is retracted along track 34 toward the preheating chamber 12 and the pair of glass sheets 42 are lowered onto assembly 46 by retracting piston rod 64 in cylinder 66. The supporting means 58 is lowered sufficiently so that the uppermost tips of the rods 60 are below the top surface of the platen of assembly 46, thereby allowing the glass pair 42 to rest freely upon the platen.

The upper vacuum assembly 44 is lowered to engage the top surface of the top sheet 70 and a vacuum applied thereto. The assembly 44 and the sheet 70 attached thereto are raised a short distance into proper position for welding and maintained in such position preparatory to the commencing of the welding operation. The welding operation can then be carried out in the manner taught by U.S. Patent 2,624,979.

After the glass sheets 68 and 70 have been edge welded to form the desired double glazed unit 72, the upper assembly 44 is elevated, thereby lifting the double glazed unit 72, and a second carriage 74 is moved into the welding chamber 14. The unit 72 is deposited onto carriage 74 which passes then through door 30 to the annealing chamber 16.

FIGURE 2 shows the upper and lower platen assemblies, 44 and 46 respectively, in greater detail. The lower vacuum assembly 46 includes a platen 80 which may be formed of any suitable refractory material such as high silica glass. This platen is provided with one or more depressions 82 having a connection 84 to a source of vacuum so that a sheet of glass thereon can be held securely in position during the various welding and forming operations. Platen 80 is preferably in a fixed position.

At the extremities of the lower platen, and beneath the electrodes 86, are blocks 88 of a refractory material such as soapstone. These removable blocks receive the majority of the damaging high voltage arcs from the electrodes 86 and are much more cheaply replaced than would be an entire bottom platen of an appropriate size to support the glass sheet 68.

The upper platen assembly 44 includes a top base platen 90 which is connected to the lower extremities of support 48, as by bolting. The supports 48 may be tubular to house the vacuum lines required of platen assembly 44. Platen 90 is formed of a refractory material such as high silica glass and is provided with a depression 92 having a support island 94 in the center thereof. A tubular cavity 96 in the platen 90 communicates the depression 92 with the vacuum line 98.

The working platen or interchangeable platen 100 is attached to the smoothly polished undersurface 101 of base platen 90 by virtue of the vacuum pressure created in depression 92. Platen 100 is also formed of a material such as high silica glass and is in turn provided with a suitable depression 102 or series of depressions. Tubular cavity 104 runs through the center of platen 100 and communicates with a corresponding cavity 106 running up through the center of island 94 which in turn communicates with vacuum line 108.

The vacuum lines 98 and 108 may be tied to a single vacuum pump through separate manifold systems or directly to individual vacuum pumps. The only requirement in that lines 98 and 108 operate independently.

As a safety precaution, two cylindrical holes 110 are drilled through platens 90 and 100 and a keyed-pin arrangement 112 is provided to catch the platen 100 should the vacuum in depression 92 fail.

So long as the bottom surface of the base platen 90 and the top surface of the working platen 100 are accurately planed and polished, no gasketing is required in the island 94 to isolate the vacuum in depression 92 from the vacuum in line 106, nor will such be required along the periphery of platen 90 to isolate the vacuum in depression 92 from the atmosphere.

When very large working platens are to be employed, it may be desirable, since the size of the top base platen 90 is fixed, to secure to the top surface of the working platen 100 an intermediate reinforcing platen and then apply a vacuum to depression 92 to lift the now reinforced working platen.

Care must be taken in fabricating the top base platen 90 to insure that the area of the vacuum chamber 92 is sufficient in view of the amount of vacuum pressure available to safely support the weight of the double-glazed glass unit 72 and the top working platen 100, as well as any intermediate reinforcing platen that might be used.

By way of a specific example, a particular top base platen of 34 inches by 28 inches was fabricated with a vacuum chamber area 92 of approximately 386.7 sq. in. (It should be pointed out here that it is only the vacuum chamber area that is significant, the volume of that chamber is of no importance.) With such an area, and drawing approximately 22 inches of vacuum in that chamber, the maximum load permissible is approximately 4,176 pounds.

The combined weight of a top working platen of 62 inches by 44 inches by 1 inch and an intermediate reinforcing platen of 54 inches by 40 inches by 1 inch is approximately 400 pounds. Allowing, quite conservatively, 200 pounds as the weight of the double glazed unit 72, the maximum actual load is approximately 600 pounds. Since the maximum permissible load is approximately 4,176 pounds, this operating range has a safety factor of 7.

The above described platen assembly was designed assuming the need for an intermediate reinforcing platen. In actual practice, however, a reinforcing intermediate platen is not required more than 20% of the time. Therefore, in these instances when an intermediate reinforcing platen is not used, i.e. 80% of the time, the safety factor will be even greater than 7.

It must be recognized that several different sizes of top base platens as well as top working platens will be employed in different welding lines. Therefore the exact dimensions and vacuum pressures involved should be calculated for each top base platen, estimating the maximum actual load to be encountered to arrive at the desired safety factor.

I claim:

1. In apparatus for welding the marginal edges of a pair of vertically aligned, horizontally disposed, spaced glass sheets, including first support means supporting the lower sheet of said pair, second support means supporting the upper sheet of said pair in spaced, superposed relationship to the lower sheet and welding means to electrically heat and fuse the marginal edges of the sheets together, the imrovement comprising,
   (a) a plate structure forming a part of said second support means and having a cavity in one surface thereof,
   (b) means for applying a suction effect to said cavity,
   (c) a second plate structure larger than said cavity and having a top and bottom surface,
   (d) said first plate structure adapted to engage said top surface and retain said second plate in association therewith when a suction effect is applied to said cavity,
   (e) said bottom surface having at least one cavity therein,
   (f) means, independent from said means for applying a suction effect to the cavity of said first plate structure, for applying a suction effect to said last named cavity to thereby retain the upper sheet of glass in association therewith.

2. In apparatus for welding the marginal edges of a pair of vertically aligned, horizontally disposed, spaced glass sheets, including first support means supporting the lower sheet of said pair, second support means supporting the upper sheet of said pair in spaced, superposed relationship to the lower sheet and welding means to electrically heat and fuse the marginal edges of the sheets together, the improvement comprising a support structure, a first vacuum chuck forming a part of said second support means and being secured to said support structure, a second separate vacuum chuck adapted to be held by said first chuck, means to evacuate said first chuck to hold said second chuck and means, operable independently from said last-mentioned means, to evacuate said second chuck and support the upper sheet of glass in association therewith.

3. In apparatus for welding the marginal edges of a pair of vertically aligned, horizontally disposed, spaced glass sheets, including first support means supporting the lower sheet of said pair, second support means supporting the upper sheet of said pair in spaced, superposed relationship to the lower sheet and welding means to electrically heat and fuse the marginal edges of the sheets together, the improvement comprising a first vacuum chuck forming a part of said second support means, a second independent vacuum chuck, said first chuck constructed and arranged to hold the second chuck and said second chuck constructed and arranged to hold the upper sheet of glass, and means to evacuate and release the vacuum of each chuck independently of the other.

4. In apparatus for welding the marginal edges of a pair of vertically aligned, horizontally disposed, spaced glass sheets, including fixed means to support the lower sheet of said pair, movable means to support the upper sheet of said pair in spaced, superposed relationship to the lower sheet and welding means to electrically heat and fuse the marginal edges of the sheets together, the improvement which comprises a first vacuum chuck forming a part of said movable means; means to evacuate and release the vacuum of said first vacuum chuck; a second vacuum chuck constructed and arranged to be supported by said first vacuum chuck and to support, in a horizontal plane, the upper sheet of glass of said pair; and means, operable independently from said means to evacuate and release the vacuum of said first vacuum chuck, to evacuate and release the vacuum of said second vacuum chuck; whereby said upper sheet may be alternately supported and released by said second vacuum chuck while said second vacuum chuck is supported by said first vacuum chuck.

References Cited by the Examiner

UNITED STATES PATENTS

| | | | |
|---|---|---|---|
| 2,776,163 | 1/1957 | Cremer | 294—64 |
| 2,900,761 | 8/1959 | Clever | 65—58 X |
| 2,977,722 | 4/1961 | Mazzoni | 65—58 X |

DONALL H. SYLVESTER, *Primary Examiner.*

G. R. MYERS, *Assistant Examiner.*